April 10, 1934.    C. E. L. LIPMAN    1,954,014
MOTOR DRIVEN UNIT
Filed May 24, 1930    2 Sheets-Sheet 1
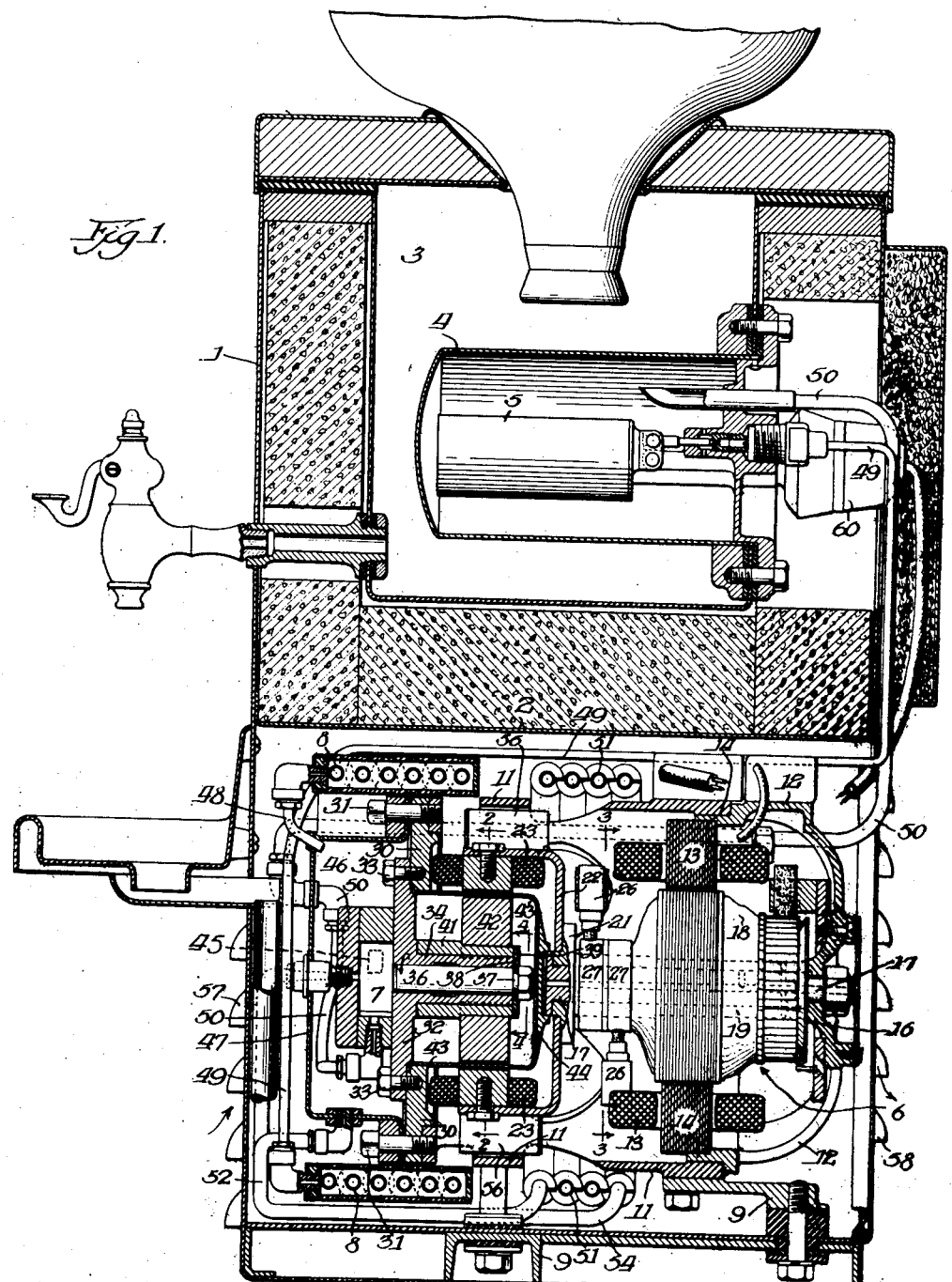

April 10, 1934.  C. E. L. LIPMAN  1,954,014
MOTOR DRIVEN UNIT
Filed May 24, 1930   2 Sheets-Sheet 2
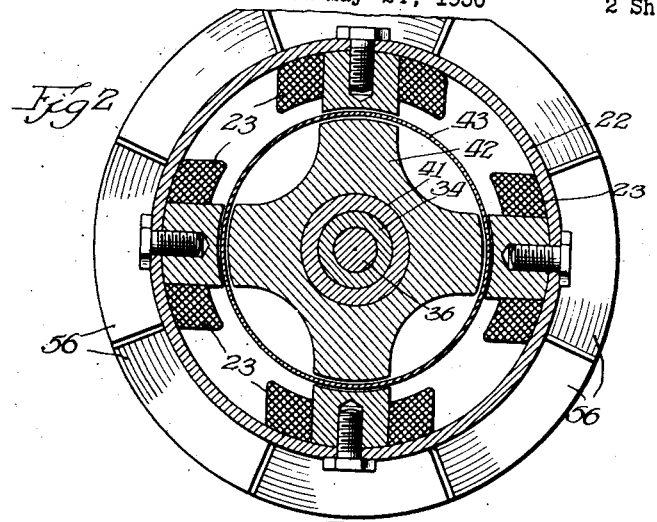
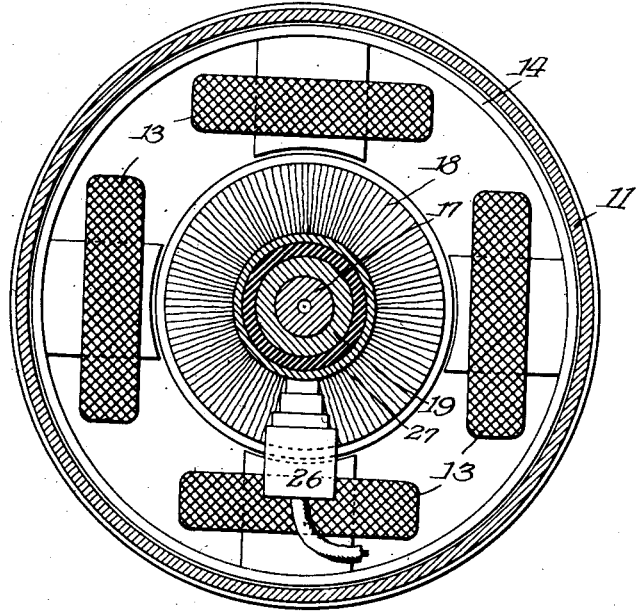
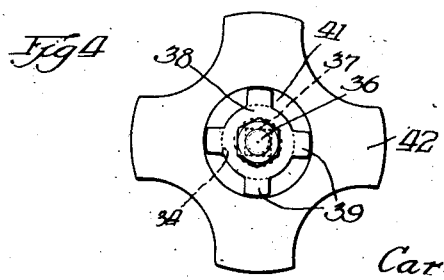
Inventor:
Carl E. L. Lipman
By Wilson, Dowell, McCanna & Rehm
Attys
Witness
R. B. Davison Patented Apr. 10, 1934

1,954,014

UNITED STATES PATENT OFFICE 1,954,014

MOTOR DRIVEN UNIT

Carl E. L. Lipman, Chicago, Ill., assignor to Lipman Patents Corporation, Chicago, Ill., a corporation of Delaware Application May 24, 1930, Serial No. 455,227

15 Claims. (Cl. 172—36)

This invention relates generally to a combined driving and driven apparatus particularly suitable in a refrigerating system.

While I have shown and described herein as illustrative of the principles of my invention a refrigerating unit particularly adaptable for use in water coolers it will be manifest that many of the principles and features of my invention are capable of embodiment in apparatus suitable for purposes other than that of refrigeration.

One of the purposes of my invention is to provide a unit embodying a driving motor and a driven member such as a compressor or vacuum pump within a sealed compartment, the two being connected and arranged in a novel and compact assembly which will occupy a minimum of space; which will permit of ready removal of those parts most likely to require repair and replacement; which will be highly efficient in operation; which will be durable in use; and which can be economically manufactured and assembled.

In accordance with this invention I accomplish some of the desired objects by driving the pump or compressor, for example, by an electric motor through a magnetic clutch, the various elements being mounted and supported in such a way that through the medium of the magnetic clutch drive the entire driving mechanism may be removed without interfering with the compressor and associated elements of the complete system. Other advantages, objects and novel points of construction will be appreciated as the same becomes better understood from an examination of the specification and claims in connection with the accompanying drawings, wherein Fig. 1 is a vertical sectional view through a water cooler embodying my invention;

Fig. 2 is a fragmentary sectional view taken on line 2—2 of Fig. 1;

Fig. 3 is a fragmentary sectional view taken on line 3—3 of Fig. 1; and

Fig. 4 is a fragmentary sectional view taken on line 4—4 of Fig. 1.

Referring particularly to the drawings and more particularly to Fig. 1, it is seen that my invention is shown as applied to a water cooler in which the entire mechanism is enclosed in a casing 1. This casing is divided by a partition 2 into an upper compartment housing the water compartment 3 in which is located the evaporator 4 or low pressure side of the refrigerating system controlled by a float 5, and a lower compartment which houses the high pressure side of the refrigerating system comprising the motor 6, compressor 7 and condensing coils 8.

The motor compressor unit, which also includes the condenser, is supported from the bottom of the casing 1 by feet 9 secured to a substantially cylindrical housing 11, the latter serving as the main support for both the motor and compressor.

To one end of the cylindrical housing 11 is secured a spider 12 by bolts or the like (not shown), the spider serving as a secondary support or mount for the field coils or stator 13 of the driving motor and being formed with a reduced annular ring 14 of proper diameter to fit within the end of housing 11. The end portion of spider 12 is provided with a central boss 16 to which is secured a horizontal stationary stud or shaft 17. Shaft 17 serves as the support for the armature or rotor 18 of the driving motor illustrated as a direct current motor although it is obvious that an alternating current motor may be utilized in place thereof. The armature 18 is provided with a bushing or sleeve 19 which serves as a bearing between the stationary shaft 17 and the armature 18.

The inner end 21 of sleeve 19 has pressed or otherwise secured thereto for rotation therewith a cup-like member 22 which serves as a housing or support for the energizing coils 23 of the outer driving member of a magnetic clutch. These coils may be energized from any suitable source connected to brushes 26 engaging slip rings 27 carried by the armature 18.

The field coils 13, armature 18, clutch member 22 and clutch coils 23 are all carried by the spider 12 and shaft 17. Thus when spider 12 is disconnected from casing 11, the entire mechanism thus far described can be removed therewith. In this manner ready access may be had to the driving unit which may be readily repaired or replaced.

To the other end of casing 11 is secured an annular ring 30 by means of cap screws 31 which in turn supports an end plate 32 secured thereto by means of cap screws 33. Formed integrally with the end plate 32 is a horizontal tubular post 34 which serves as the journal for the compressor shaft 36. The outer end of the compressor shaft 36 is squared as at 37 to fit the squared aperture within driving disc 38. Disc 38 is provided with a plurality of laterally projecting fingers 39 which engage in slots in the end of a sleeve 41 which is journalled upon the outside of post 34. The inner driven member 42 of the magnetic clutch is pressed or otherwise secured to sleeve 41. The driven member 42 will accordingly drive shaft 36 through sleeve 41 and disc 38. The inner end of the compressor unit may be sealed by a cap 43 which passes between the outer or driving member of the magnetic clutch and the inner or driven member of the magnetic clutch. The outer end surface of cap 43 may be provided, if desired, with a steady rest 44 recessed to receive the inner end of shaft 17.

The compressor or pump 7 which is driven by shaft 36 and preferably formed integrally therewith serves to deliver refrigerant under pressure through outlet 45 to the chamber 46 formed within casing 47 secured to ring 30 from which it is delivered through pipe 48 to the condenser 8 and thence through pipe 49 to the evaporator 4. From the evaporator 4 the refrigerant is withdrawn through pipe 50 to the suction side of compressor 7.

The compressor end of the unit is partially cooled by the lubricant which is cooled by a radiator. The lubricant delivered by the compressor collects in the bottom of chamber 46 from which it is conducted through pipe 52 to the oil cooling coils 51 and thence back through pipe 54 to the suction side of the pump where it is positively circulated with the lubricant, separating out in chamber 46. The suction of the pump in combination with the pressure of the gas in chamber 46 upon the surface of the oil therein serves to keep the oil in constant circulation.

As an additional cooling means the cap 22 may be provided with spirally arranged volume blades 56 constructed to draw air in through the front end of the casing, which is vented as at 57, directly over the condenser coils, then through the oil cooling coils and the motor and then out through the vents 58 formed in the rear of casing 1.

The motor is controlled by the usual thermostatically controlled switch 60 associated with the water compartment.

From the foregoing it can be seen that there has been provided a motor compressor unit of the sealed type in which the driving motor may be removed in its entirety for replacement or repair and which when removed gives ready access to the compressor unit. The whole unit due to the construction described may be housed in a small restricted space.

It is obvious that many changes may be made in the details of construction without departing from the spirit and scope of this invention as defined in the claims appended hereto.

I claim:

1. An apparatus comprising, a driving motor, a member driven therefrom, separable driving connections therebetween all adapted to be combined as a single unit, a supporting member for said unit, a spider removably secured to said supporting member, the stator of said motor being carried by said spider, and a stationary shaft secured to said spider and serving as a support for the rotor of said motor.

2. An apparatus comprising, a driving motor, a member driven therefrom, a separable clutch between said motor and driven member, a single supporting member for said motor and member, a spider removably secured to said supporting member, said driving motor and one element of said clutch being supported from said spider, and fan blades secured to said clutch member for rotation therewith and adapted to direct air over said driven member and driving motor.

3. An apparatus comprising, a driving motor, a member driven therefrom, a separable clutch operatively connecting said motor and said driven member, a supporting member for said motor and driven member, a spider removably secured to one end of said supporting member, said spider having a stationary shaft secured thereto, a sleeve surrounding said shaft and serving as the bearing member for the rotor of said motor, said motor and one element of said clutch being removable with said spider.

4. An apparatus, comprising, a driving motor, a member driven therefrom, a separable clutch therebetween, a supporting member for said motor and driven member, a spider removably secured to one end of said supporting member and serving as a support for the stator of said motor, a stationary shaft secured to said spider, a sleeve journalled on said shaft and serving as a bearing for the rotor of said motor, a clutch housing secured to said sleeve in which is secured one element of said separable clutch, said spider, motor and clutch housing being removable as a unit from said supporting member.

5. An apparatus comprising, a driving motor, a member driven therefrom, a supporting member for said motor and driven member, a separable clutch therebetween, a spider removably secured to one end of said supporting member and serving as a support for the stator of said motor, a stationary shaft secured to said spider, a sleeve journalled on said shaft and serving as a bearing for the rotor of said motor, a clutch housing secured to said sleeve, and fan blades carried by said housing in which is secured one element of the separable clutch, said spider, motor and clutch housing being removable as a unit from said supporting member.

6. An apparatus comprising a driving motor, a member driven therefrom, a casing for hermetically sealing said driven member, a supporting member for said motor and driven member, a separable clutch operatively connecting said motor and driven member, a spider removably secured to one end of said supporting member and serving as a support for the stator of said motor and a stationary shaft serving as a support for the rotor of said motor and having one end secured to said spider and the other end seated in said casing.

7. An apparatus comprising a driving motor, a member driven therefrom, a casing for hermetically sealing said driven member, a supporting member for said motor and driven member, a separable clutch for operatively connecting said motor to said driven member, a spider removably secured to one end of said supporting member and serving as a support for the stator of said motor, a stationary shaft secured at one end to said spider and seated at its other end in said casing, a sleeve journalled on said shaft and serving as a bearing for the rotor of said motor and a clutch housing secured to said sleeve in which is secured one element of the separable clutch, the other element of said clutch being disposed within said casing.

8. An apparatus comprising, a driving motor, a member driven therefrom, separable driving connections therebetween all constituting a single unit, a supporting member for said unit, a spider removably secured to said supporting member, the stator of said motor being carried by said spider, and means secured to said spider and serving as an independent support for the rotor of said motor.

9. An apparatus comprising, a driving motor, a member driven therefrom, separable clutch members therebetween all constituting a single unit, a supporting member for said unit, a spider removably secured to said supporting member, the rotor and stator of said driving motor being independently carried by and removable with said spider.

10. An apparatus comprising a unitary structure including a hollow supporting casing, a driving motor disposed within one end of said casing, a driven member disposed within the other end of said casing and a separable clutch connecting said motor and driven member, said motor and one element of said clutch being independently bodily removable axially from one end of said casing and said driven member being bodily removable axially from the other end of said casing.

11. An apparatus comprising a unitary structure including a hollow supporting casing, a driven member disposed within one end of said casing, a spider secured to the other end of said casing, a driving motor carried by said spider and a separable clutch connecting said motor and driven member, said motor and one element of said clutch being independently and bodily removable with said spider in a direction parallel to the axis of said casing and from one end thereof, said driven member also being bodily removable in an axial direction from the other end of said casing.

12. An apparatus comprising a unitary structure including a cylindrical supporting casing, a driving motor disposed within one end of said casing, a driven member disposed within the other end of said casing and a separable clutch connecting said motor and driven member, said motor and one element of said clutch being independently bodily removable axially from one end of said casing and said driven member being bodily removable axially from the other end of said casing.

13. An apparatus comprising a unitary structure including a hollow supporting casing, a driving motor disposed within one end of said casing, a driven member disposed within the other end of said casing and a magnetic clutch connecting said motor to said driven member, said motor and one element of said clutch being independently bodily removable axially from one end of said casing and said driven member being independently and bodily removable axially from the other end of said casing.

14. An apparatus comprising a unitary structure including a hollow supporting casing, a driving motor disposed within one end of said casing, a driven member disposed within the other end of said casing, a magnetic clutch connecting said motor to said member, and fan blades carried by one clutch member, said motor and one element of said clutch being independently bodily removable axially from one end of said casing and said member being independently and bodily removable axially from the other end of said casing.

15. An apparatus comprising a unitary structure including a hollow supporting casing, a driving motor disposed within one end of said casing, a driven member disposed within the other end of said casing, a magnetic clutch connecting said motor to said member, and lubricant cooling coils connected to receive the lubricating oil for said driven member, said coils surrounding the exterior of said casing, said motor and one element of said clutch being independently bodily removable axially from one end of said casing and said member being independently and bodily removable axially from the other end of said casing.

CARL E. L. LIPMAN.